United States Patent [19]

Curran

[11] Patent Number: 4,791,993
[45] Date of Patent: Dec. 20, 1988

[54] FIRE PROTECTION SYSTEM

[76] Inventor: Jeremiah M. Curran, 1212 Madison Dr., Yardley, Pa. 19067

[21] Appl. No.: 102,713

[22] Filed: Sep. 30, 1987

[51] Int. Cl.$^4$ .............................................. A62C 35/00
[52] U.S. Cl. ....................................... 169/16; 169/37; 239/209; 239/267; 239/536
[58] Field of Search ................... 169/5, 16, 17, 18, 37; 239/208, 209, 267, 536

[56] References Cited

U.S. PATENT DOCUMENTS

| | | | |
|---|---|---|---|
| 166,003 | 7/1875 | Harris | 239/267 |
| 2,768,693 | 10/1956 | Sherburne | 169/37 |
| 3,436,068 | 4/1969 | Beals et al. | 239/208 |
| 3,892,277 | 7/1975 | Curran | 169/16 |
| 4,220,208 | 9/1980 | Jackson et al. | 169/37 |

Primary Examiner—Sherman D. Basinger
Assistant Examiner—Thomas J. Brahan
Attorney, Agent, or Firm—Charles H. Lindrooth

[57] ABSTRACT

Disclosed is an integral fire protection and ceiling structure for use in a building of the kind wherein false ceilings are employed. The fire protection system comprises a rectangular gridwork of pipe sections with four-way cast pipe fittings to which the pipe sections are joined. Each fitting has a downwardly-directed outlet in which a sprinkler head is mounted. The false ceiling structure comprises intersecting support runners forming a gridwork of rectangular frames where the dimensions of the gridwork of the pipe sections are even multiples of the dimensions of the rectangular frames with the intersecting support runners being beneath and in vertical alignment with intersecting pipe sections of the pipe section gridwork. The sprinkler heads extends through the intersections of the support runners. Suspension means suspend the support runners from the grid of conduits.

9 Claims, 3 Drawing Sheets

FIRE PROTECTION SYSTEM

FIELD OF THE INVENTION

This invention relates to fire protection systems of the type using a plurality of spaced-apart sprinklers through which water or other fire-extinguishing fluid is discharged or dispersed. Sprinklers of the kind described are usually controlled by a heat- or smoke-responsive device which activates in the presence of smoke or heat to open a sprinkler valve. In some systems, as where temperatures within the enclosure being protected by the system may fall below the freezing point, a single valve may be located in a heated place to serve a plurality of sprinklers within the unheated enclosure. In systems where freezing is not a problem, each sprinkler may have its own valve and heat- or smoke-activated device.

Further, the present invention relates to fire protection systems useful in construction of the type in which suspended ceilings are employed in order to conceal building services, such as heating, ventilating, air conditioning duct work, electrical services and the like.

Suspended ceilings of the type referred to comprise a grid of intersecting runner-type support elements extending in two directions normal to one another. The support elements support substantially rectangular ceiling tiles. The tiles are of standard dimension being sized to fit within a grid spacing which is commonly 2'×2' or 2'×4' or occasionally 2'×6'.

SUMMARY AND OBJECTS OF THE INVENTION

In accordance with the invention, a gridwork of intersecting fluid conduits is interconnected to a common source of fire extinguishing fluid. The conduit gridwork overlies tee false ceiling with the conduits in vertically-aligned relationship with the intersecting ceiling tile runner-type support elements, and with sprinkler heads extending downwardly from pipe couplings to which the conduits are joined at their points of intersection. Preferably, the interval between the intersection points for the conduits is a multiple of the distances between the intersections of the tile support elements so that the sprinkler heads extend through every second, third or fourth intersection point, depending on the ceiling grid dimensions and the spray density desired. Preferably, coupling elements requiring no welding, soldering or threading for interconnection of the conduits of the system are utilized. A common suspension system for the conduits and the ceiling support elements is provided, thus minimizing the number of vertical suspension elements in the space above the false ceiling.

Among the various objects and advantages of the invention is the simplification of the installation of the fire protection system in that the entire system has the capability of being prefabricated from conduits which are provided in preselected pre-cut lengths, which are multiples of the length and width dimensions of the basic suspended ceiling grid. Depending on the spray density and the radius of the spray provided by the sprinkler heads, the spacing is determined in advance by the installer and appropriate lengths of conduit selected from inventory. Little or no cutting of pipe at the construction site is required.

Another object of the invention is the provision of a fire extinguishing system in which a plurality of fire-extinguishing fluid paths extend to each sprinkler. Uniformity of pressure and minimization of pressure drop throughout the gridwork of sprinklers is thereby achieved.

Other objects and advantages of the invention will become apparent upon reference to the detailed description of the preferred embodiment of the invention as set forth herein.

DETAILED DESCRIPTION OF THE INVENTION

Figure 1:
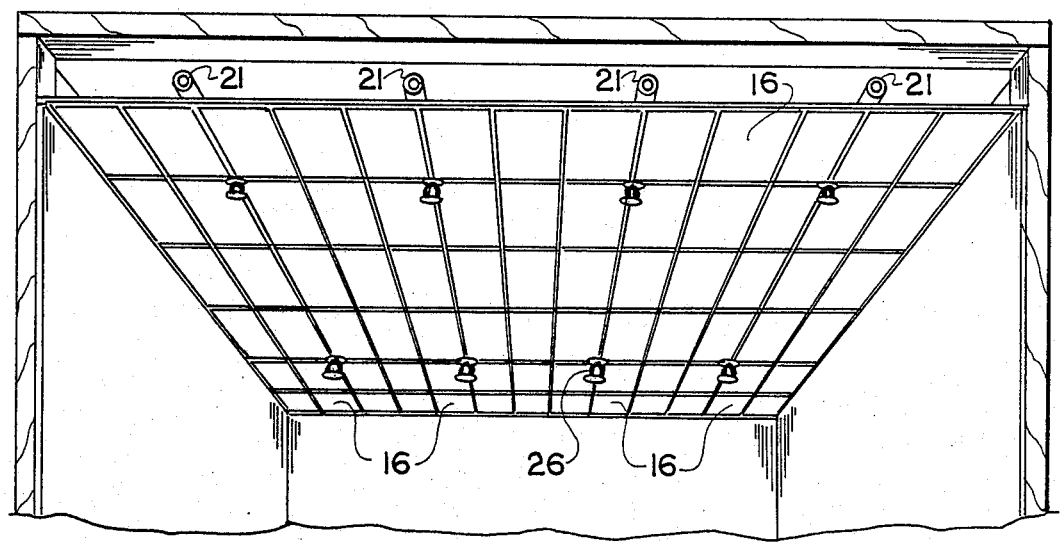
FIG. 1 is a perspective view looking upwardly towards a suspended ceiling showing a gridwork of sprinklers disposed in accordance with the invention, within an enclosure.

With reference first to FIGS. 1–4, a typical suspended ceiling is shown within a room of a conventional building wherein a grid of intersecting ceiling tile support elements 10 and 11 for a false ceiling is spaced beneath the true ceiling of the structure. As is known in the art, the main and intermediate support elements 10 and 11 for the false ceiling comprise runners having horizontally-extending support surfaces 12 and one or more vertical stiffeners 13. The horizontally-extending support surfaces 12 on the runners support the perimeter of rectangular ceiling tiles 16 within an open grid. In the conventional construction referred to, the main runners 10 extended continuously from one side of the room to the other, whereas the ends of the intermediate runners 11 are fastened to the main runners at spaced locations by tabs on the intermediate runners, which fit within slots in the main runners in a manner known in the art.

Those skilled in the art will recognize that the ceiling tiles of the false ceiling are generally of standard dimension, the grids in which the tiles fit being commonly two feet wide and having a length of two, four or, occasionally, six feet.

Figure 2:
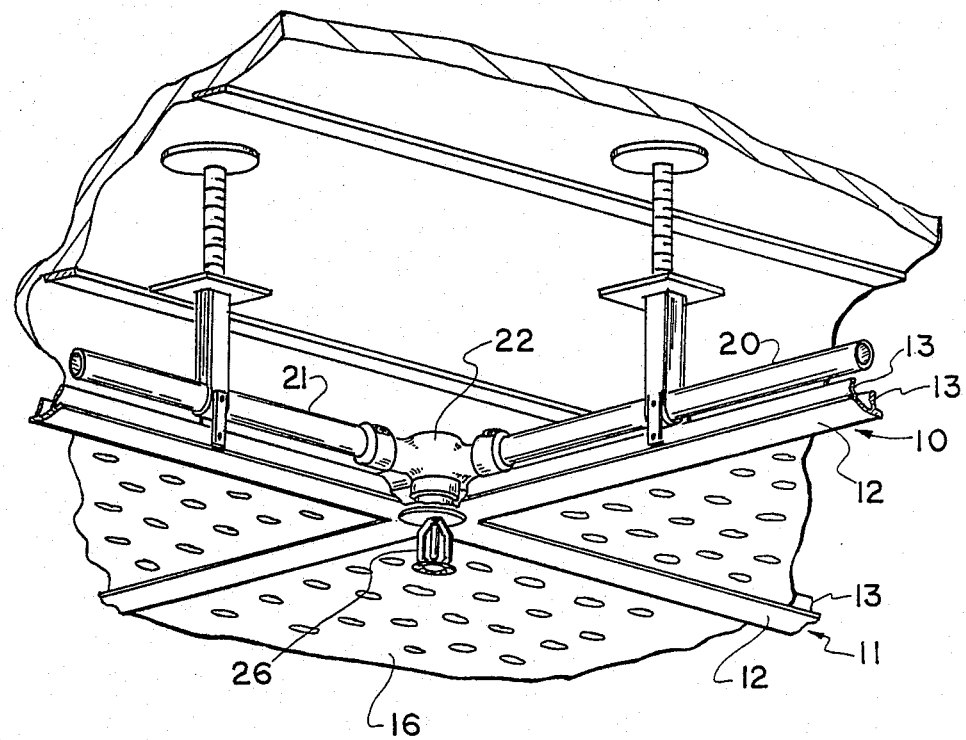
FIG. 2 is a fragmentary perspective view showing the suspended ceiling with one tile removed in order to illustrate a typical installation of the system.
Figure 3:
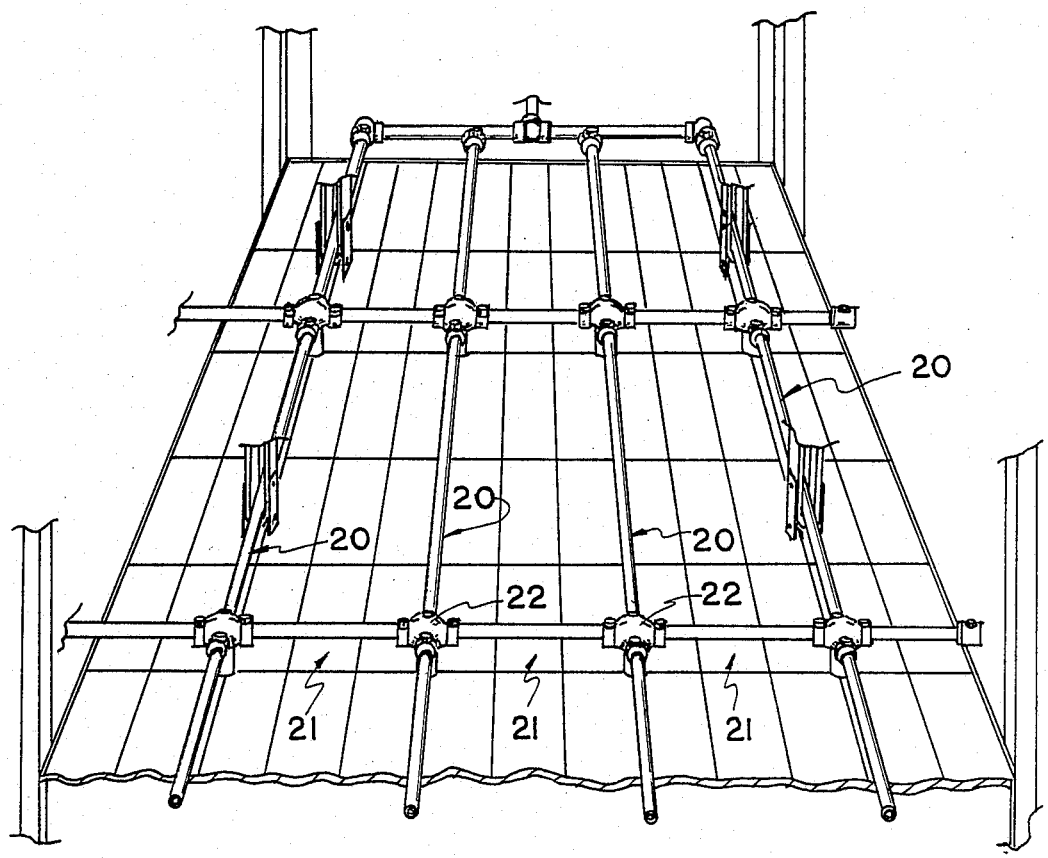
FIG. 3 is a perspective view illustrating the invention, looking downwardly from above the suspended ceiling rather than upwardly.
Figure 4:
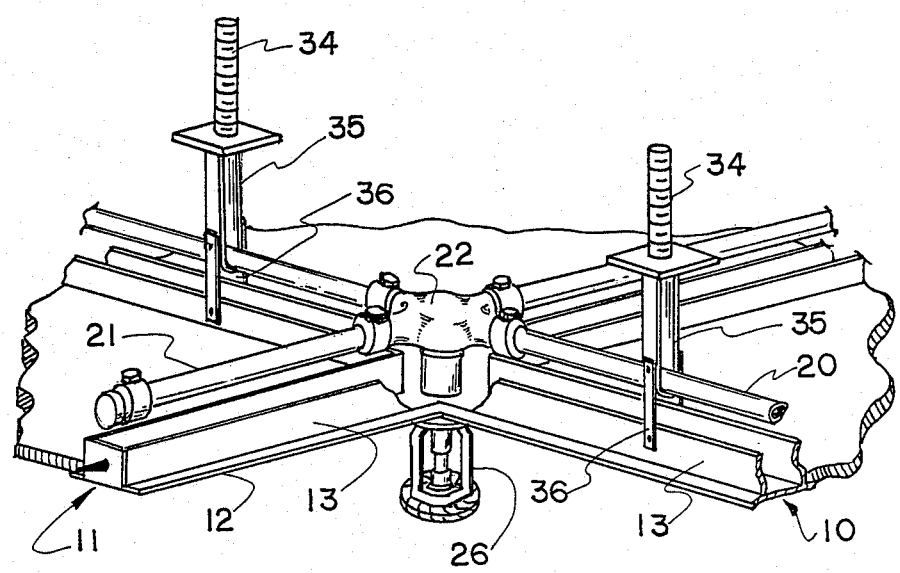
FIG. 4 is a fragmentary perspective view similar to FIG. 2 but looking downwardly toward the upper surface of the suspended ceiling.

With special reference to FIGS. 2–4, the fire protection system is shown as being installed in the space above the false ceiling along with other building utility services including plumbing, HVAC ducting and electrical and telephone lines. In accordance with the invention, the fire protection system comprises a gridwork of conduits including conduit sections 20, extending in a first direction, and conduit sections 21, extending in a second direction which is perpendicular to the first direction. The conduit sections are vertically in alignment with the main and intermediate runners. Water or other fire-extinguishing fluid is supplied from a main or riser 18 and header 19.

Figure 5:
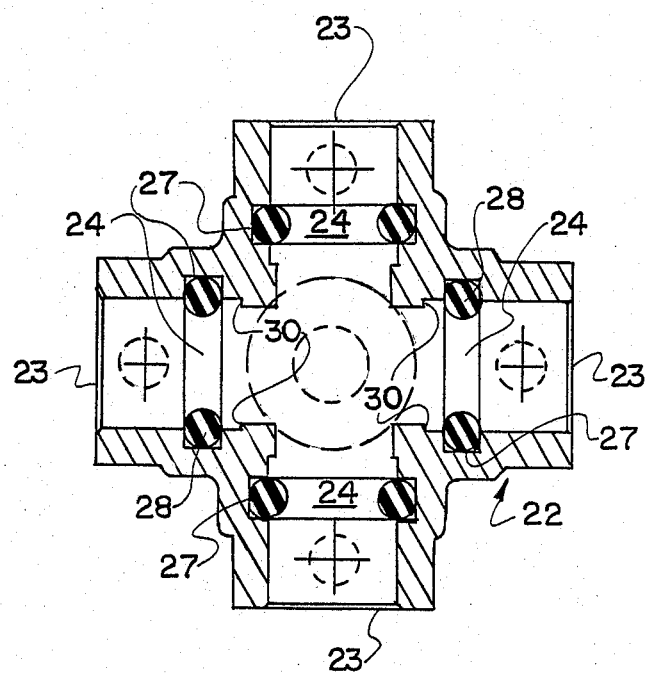
FIGS. 5 and 6 are plan elevational sectional views respectively, showing a preferred form of coupling utilized to interconnect conduits of the invention.
Figure 6:
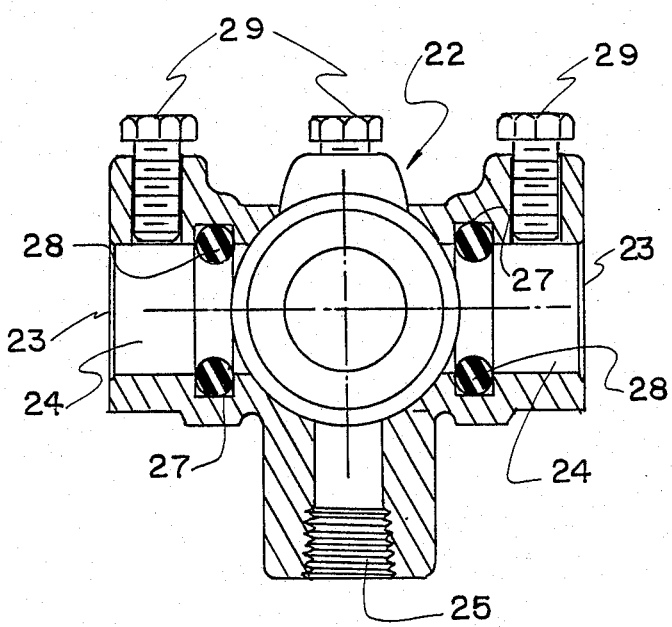

Pipe coupling elements or fittings 22 best shown in FIGS. 5 and 6 interconnect the conduits 20 and 21 at the points of intersection within the gridwork. The coupling elements 22 are preferably of cast construction and have four inlet openings 23 forming intercommunicating passages 24 and a downwardly-directed outlet 25 which is preferably internally threaded as at 25 to receive the threaded inlet of a conventional sprinkler 26. The sprinklers 26 extend vertically downwardly through openings which are cut in the base web of the main runners at selected points were they intersect with the intermediate runners. The sprinklers may be of the retractable variety which are held in spring-loaded position above the level of the false ceiling until required for use.

Preferably, each inlet passage has an annular groove 27 within which an annular O-ring-type sealing gasket 28 is fitted. Each passage is also fitted with clamping means which is preferably comprised of a set screw 29. The openings in the coupling elements are dimensioned to receive the conduit ends which are moved axially to abut against stop surfaces 30 to effect fluid-tight seals with gaskets 28. The set screws 29 provide a simple and effective means for locking the conduit sections in place within the inlet passages.

Figure 7:
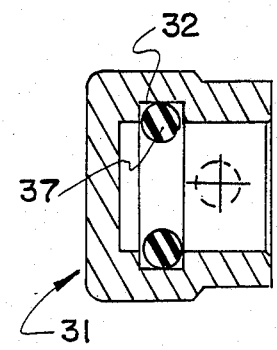
FIGS. 7 and 8 are suitable end caps which may be employed at the ends of each section.
Figure 8:
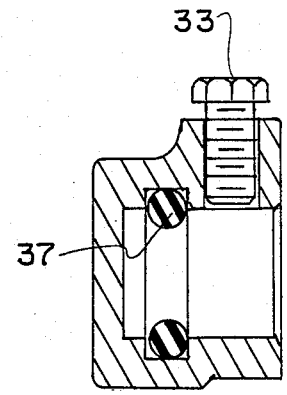

At the ends or sides of the gridwork, where sprinkler heads may be unnecessary, suitable plugs or caps 31 such as shown in FIGS. 7 and 8 are provided. As indicated, the caps have an O-ring-type sealing gasket 37 fitted within annular grooves 32. A set screw 33 locks the caps onto the ends of pipe sections which are also coupled into the inlet opening of the adjacent pipe coupling element.

Preferably, common suspension means for the fire protection system and the false ceiling are provided. For this purpose, lag bolts 34 which are fastened to the main ceiling are provided with hanger straps 35 which support the conduit sections. Runner support straps or wire hangers 36 interconnect the hanger straps 35 and the vertical stiffeners 13 of the tile support runners 10 and 11.

FIG. 3 shows for explanatory purposes a false ceiling comprised of tiles of a 2'×4' size. Although as indicated above, different spacing for the spray heads may be provided, for explanatory purposes the spray heads are portioned on centers which align with the intersections of the ceiling tile support runners, three ceiling grids or 12 feet apart in the first direction and three ceiling grids or 6 feet apart in the second direction. Different spacing may be employed depending upon the radius of the spray of the particular sprinkler head and the desired overall density of the spray. However, it is contemplated that the spray heads will be spaced apart by multiples of the dimensions of the ceiling tiles, with a typical spacing being about 12 feet in the first direction and 14 feet in the second direction when using 2'×4' ceiling tiles.

In the use of the invention, it is contemplated that all conduit sections would be pre-cut at an off-site location since the manufacturer can be assured that the bulk of the demand will be for fire protection systems integrated with false ceilings having tiles of standardized dimension, and the conduit sections can conveniently be pre-cut and stored for use as needed. At the time of installation a determination is made of the spacing of the spray heads for a particular application, and the number of conduits of each standard size is then brought to the site along with the number of fittings the spray heads require. There will be little or no need for cutting or specialized fabrication at the site.

I claim:

1. A building fire protection system comprising a plurality of pipe fittings, each having four equiangularly-disposed inlet openings, the inlet openings being interconnected within the fittings, conduits having end portions adapted to fit within the inlet openings interconnecting the inlet openings of adjacent fittings thereby providing a substantially rectangular grid of conduits and fittings with the fittings positioned at the intersections of perpendicularly-disposed conduits throughout the grid;

means connecting the conduits of the grid to a common source of fire-extinguishing liquid under pressure whereby each fitting is supplied with fire-extinguishing liquid at substantially equal pressure and by plural liquid flow paths to each fitting;

each fitting further having a downwardly-directed outlet communicating with said inlets, there being a spray orifice in said outlet.

2. A fire protection system according to claim 1 further comprising a false ceiling support frame comprised of intersecting false ceiling support runners forming a gridwork of rectangular frames, a rectangular ceiling tile supported within each of said frames, the frames each having a length and width dimension which are respectively equal to or evenly divisible into the length and width dimension of said grid of conduits and fittings whereby selected intersecting ceiling support runners are in vertical alignment with said intersecting conduits.

3. A fire protection system according to claim 2 further including first suspension means for suspending the grid of conduits from the building ceiling and second suspension means for suspending the intersecting false ceiling support runners from said grid of conduits.

4. A fire protection system according to claim 3 further including resilient annular ceiling gaskets within the inlet openings of the fittings, said annular ceiling gaskets being sized to fit over the conduit end portions to provide fluid-tight seals and clamping means threadedly secured to said fittings and extendible into clamping engagement with the end portions of said pipe fittings.

5. An integral fire protection system and ceiling structure for use in an enclosed building comprising a plurality of discrete ceiling tiles, a grid of elongated intersecting support elements for support of the ceiling tiles, a plurality of four-way pipe fittings having laterally-extending intersecting passages, said passages extending through the fittings and defining with the sidewalls of the fittings four equidistantly-spaced inlets, said fittings being positioned above the intersections of the support elements, each said fitting having a downwardly-directed outlet in fluid communication with the passages with at least one downwardly-directed spray orifice extending therethrough, said outlets being located at the intersections of adjacent ceiling support elements, the fittings being interconnected by conduits overlying and in alignment with the ceiling support elements.

6. Apparatus according to claim 5 wherein the downwardly-directed outlets of said fittings extend through the intersecting ceiling support elements at the intersections of said elements.

7. Apparatus according to claim 5 further including plural spaced-apart support hangers interconnecting the ceiling support elements to the conduits overlying said support elements.

8. Apparatus according to claim 5 further including an annular resilient sealing means within the inlets of said fittings said inlets being dimensioned to receive the ends of said conduits, said annular resilient sealing means being dimensioned to fit over the conduit ends and to provide a fluid-tight seal between said inlets and said conduit ends and releasable clamping means for holding said conduit ends in sealing relationship within said inlets.

9. Apparatus according to claim 8 further including annual positioning stops within the inlets of said fittings for positioning the conduit ends axially within said inlets.

* * * * *